(12) United States Patent  
Horino

(10) Patent No.: US 7,848,127 B2  
(45) Date of Patent: Dec. 7, 2010

(54) DIRECT-CURRENT POWER SUPPLY APPARATUS WITH IMPROVED POWER FACTOR

(75) Inventor: Hirofumi Horino, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 0 days.

(21) Appl. No.: 12/548,182

(22) Filed: Aug. 26, 2009

(65) Prior Publication Data

US 2009/0310394 A1    Dec. 17, 2009

Related U.S. Application Data

(63) Continuation of application No. PCT/JP2008/072538, filed on Dec. 11, 2008.

(30) Foreign Application Priority Data

Dec. 27, 2007    (JP) ............................. 2007-338376

(51) Int. Cl.
*H02M 5/42* (2006.01)
*H02M 7/04* (2006.01)

(52) U.S. Cl. ............................. 363/84; 363/81; 363/88; 363/89; 363/125; 363/126

(58) Field of Classification Search .................. 363/81, 363/84, 88, 89, 125, 126
See application file for complete search history.

(56) References Cited

U.S. PATENT DOCUMENTS

| | | | | |
|---|---|---|---|---|
| 4,020,411 A | * | 4/1977 | Tsuboi et al. .................. 363/68 |
| 4,144,559 A | * | 3/1979 | Okumura et al. ............... 363/88 |
| 4,947,126 A | * | 8/1990 | May et al. .................... 324/509 |
| 5,119,283 A | * | 6/1992 | Steigerwald et al. .......... 363/37 |
| 5,287,263 A | * | 2/1994 | Shilo .......................... 363/143 |
| 5,793,626 A | * | 8/1998 | Jiang .......................... 363/126 |
| 5,936,854 A | * | 8/1999 | Uesugi et al. ................. 363/44 |
| 2009/0067207 A1 | * | 3/2009 | Nishino ....................... 363/126 |

FOREIGN PATENT DOCUMENTS

| | | |
|---|---|---|
| JP | 11-75371 | 3/1999 |
| JP | 3570834 | 7/2004 |

OTHER PUBLICATIONS

International Search Report issued in International Application No. PCT/JP2008/072538, mailed Feb. 24, 2009.

(Continued)

*Primary Examiner*—Bao Q Vu
(74) *Attorney, Agent, or Firm*—DLA Piper LLP US

(57) ABSTRACT

First and second rectification circuits are connected to a commercial AC power supply by a reactor. A load is connected between the output terminal on the positive side of the first rectification circuit and the output terminal on the negative side of the second rectification circuit. While the voltage or the commercial AC power supply remains at the positive level, a current flows through a path constituted by one of the diodes of the first rectification circuit and one of the diodes of the second rectification circuit. While the voltage of the commercial AC power supply remains at the negative level, too, a current flows through the path constituted by one of the diodes of the first rectification circuit and one of the diodes of the second rectification circuit.

11 Claims, 6 Drawing Sheets

OTHER PUBLICATIONS

Written Opinion issued in International Application No. PCT/JP2008/072538, mailed Feb. 24, 2009.
English language translation of International Search Report issued in International Application No. PCT/JP2008/072538, mailed Feb. 24, 2009.
English language abstract of JP 3570834, issued Jul. 2, 2004.
Machine English language translation of JP 3570834, issued Jul. 2, 2004.
English language abstract of JP 11-75371, published Mar. 16, 1999.
Machine English language translation of JP 11-75371, published Mar. 16, 1999.

* cited by examiner

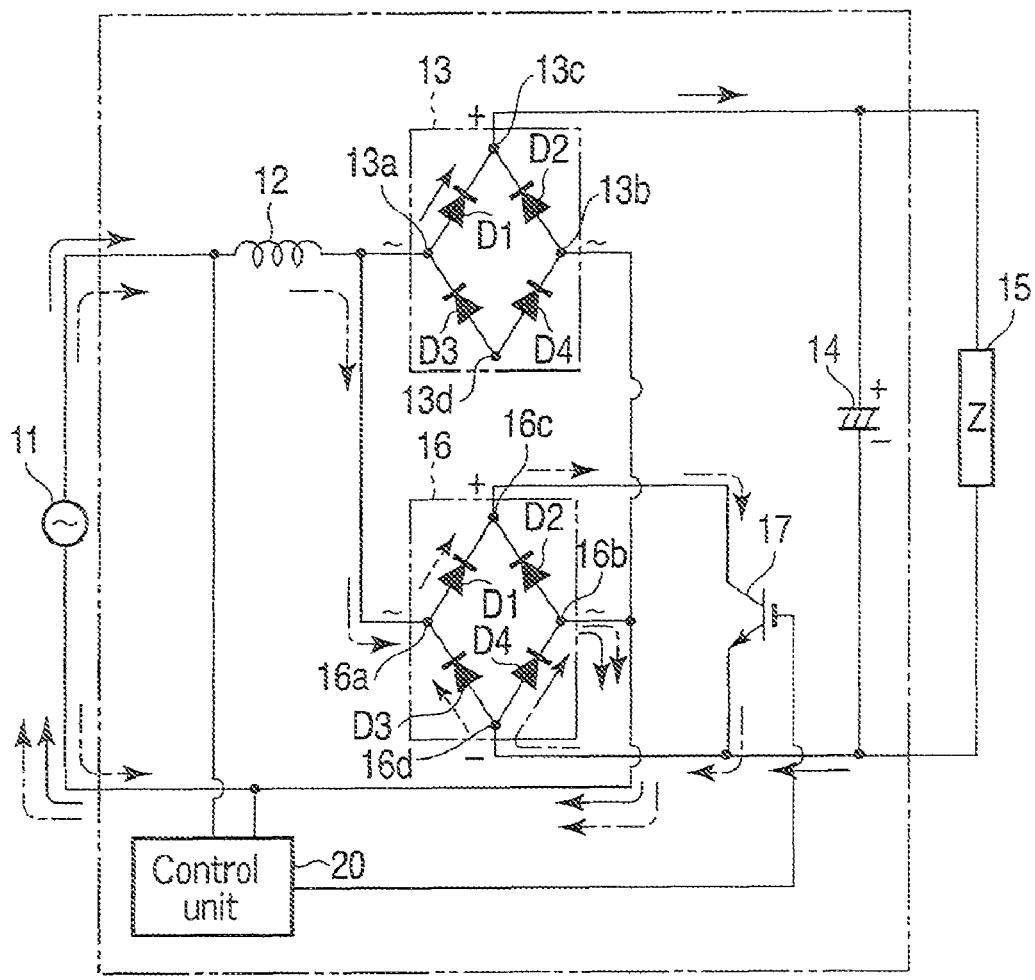
F I G. 3

US 7,848,127 B2

DIRECT-CURRENT POWER SUPPLY APPARATUS WITH IMPROVED POWER FACTOR

CROSS REFERENCE TO RELATED APPLICATIONS

This is a Continuation application of PCT Application No. PCT/JP2008/072538, filed Dec. 11, 2008, which was published under PCT Article 21(2) in Japanese.

This application is based upon and claims the benefit of priority from prior Japanese Patent Application No. 2007-338376, filed Dec. 27, 2007, the entire contents of which are incorporated herein by reference.

BACKGROUND OF THE INVENTION

1. Field of the Invention

The present invention relates to a direct-current power supply apparatus that improves the power factor of a power supply.

2. Description of the Related Art

Direct-current power supply apparatuses are known, in which a rectification circuit is connected to an AC power supply by a reactor (see, for example, Japanese Patent No. 3570834). In such a direct-current power supply apparatus, a short-circuit path for the AC power supply is formed via the reactor, only for a short time after the voltage of the AC power supply has passed the zero-crossing point, thereby improving the power factor of the power supply.

BRIEF SUMMARY OF THE INVENTION

The rectification circuit mentioned above has four bridge-connected diodes and performs full-wave rectification of the voltage of the alternating-current power supply. In this rectification circuit, a current flows through two diodes at the same time while the commercial AC power supply remains at the positive level, and flows through the other two diodes at the same time while the commercial AC power supply remains at the negative level.

When the current simultaneously flows through two of the diodes of the rectification circuit, the heat the rectification circuit generates increases. The rectification circuit therefore requires a large heat radiating means. If a large heat radiating means is provided, however, the direct-current power supply apparatus will be larger and its cost will rise.

An object of this invention is to provide a direct-current power supply apparatus in which the heat the rectification circuit generates can be reduced and which therefore reduces the size of a means for radiating heat or does not require a means for radiating heat from the rectification circuit.

A direct-current power supply apparatus disclosed herein includes:

a reactor;

a first rectification circuit having a pair of input terminals to be connected to an alternating-current power supply by the reactor, a plurality of diodes provided to rectify a voltage applied to the input terminals, and a pair of output terminals provided to output a voltage rectified by the diodes, one of the output terminals provided to be connected to one end of a load;

a second rectification circuit having a pair of input terminals to be connected to the alternating-current power supply by the reactor, a plurality of diodes provided to rectify a voltage applied to the input terminals, and a pair of output terminals provided to output a voltage rectified by the diodes, one of the output terminals provided to be connected to the other end of the load;

a switch element provided to constitute a short-circuit path for the alternating-current power supply, together with the reactor, one of the diodes of the first rectification circuit and the diodes of the second rectification circuit; and a control unit configured to turn on the switch element for a short time after the voltage of the alternating-current power supply has passed zero-crossing point, thereby forming the short-circuit path; and wherein the load is connected between the output terminal on the positive side of the first rectification circuit and the output terminal on the negative side of the second rectification circuit.

BRIEF DESCRIPTION OF THE SEVERAL VIEWS OF THE DRAWING

FIG. 3 is a block diagram showing the configuration of a third embodiment of the present invention;

DETAILED DESCRIPTION OF THE INVENTION

[1] First Embodiment

A first embodiment of this invention will be described.

Figure 1:
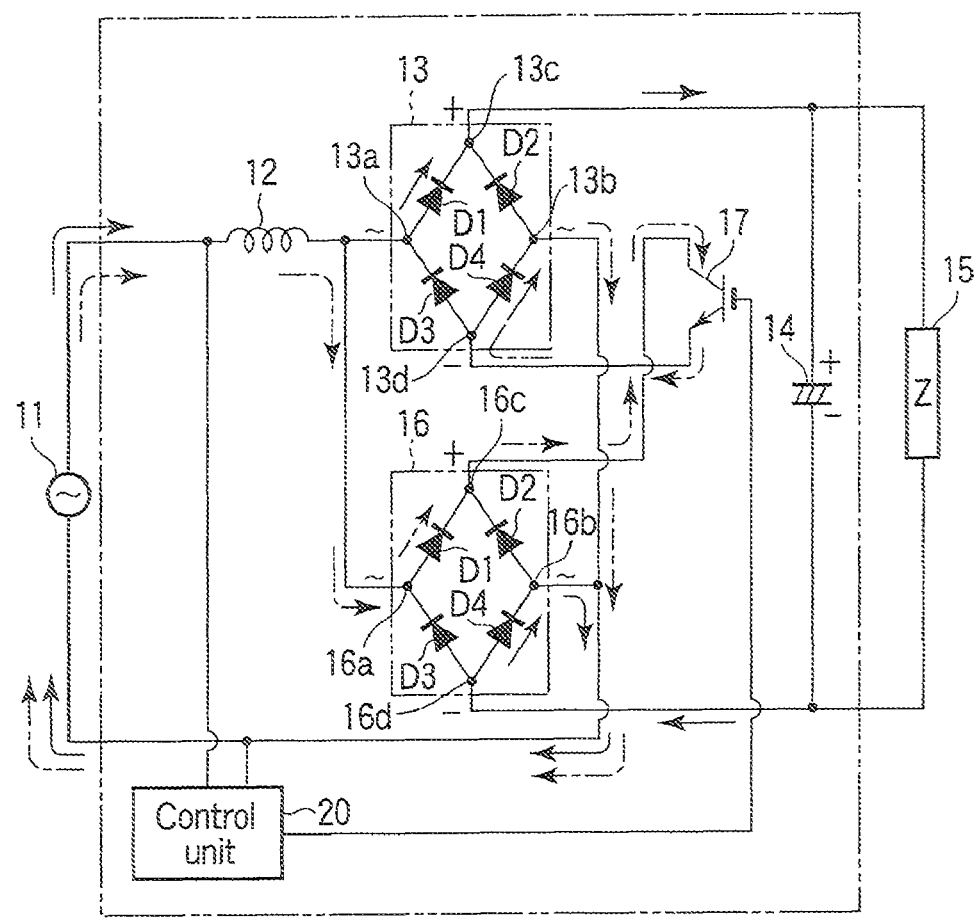
FIG. 1 is a block diagram showing the configuration of a first embodiment of the present invention.

As shown in FIG. 1, a pair of input terminals 13a and 13b of a first rectification circuit 13 are connected to a commercial AC power supply 11 via a reactor 12. The first rectification circuit 13 has the pair of input terminals 13a and 13b, four bridge-connected diodes D1, D2, D3 and D4 for achieving full-wave rectification, an output terminal 13c on the positive side, and an output terminal 13d on the negative side. The first rectification circuit 13 rectifies the alternating-current voltage input to the input terminals 13a and 13b and outputs the voltage, thus rectified, from the output terminals 13c and 13d.

A pair of input terminals 16a and 16b of a second rectification circuit 16 are connected to the commercial AC power supply 11 via the reactor 12. The second rectification circuit 16 has the pair of input terminals 16a and 16b, four bridge-connected diodes D1, D2, D3 and D4 for achieving full-wave rectification, an output terminal 16c on the positive side, and an output terminal 16d on the negative side. The second rectification circuit 16 rectifies the alternating-current voltage input to the input terminals 16a and 16b and outputs the voltage, thus rectified, from the output terminals 16c and 16d.

Between the output terminal 13c on the positive side of the first rectification circuit 13 and the output terminal 16d on the negative side of the second rectification circuit 16, a smoothing capacitor 14 and a load 15 are connected.

While the alternating-current voltage of the commercial AC power supply 11 remains at the positive level, a current flows through the smoothing capacitor 14 and load 15, through a path constituted by one end of the commercial AC power supply 11, the reactor 12, one input terminal 13a of the first rectification circuit 13, diode D1 of the first rectification circuit 13 and the output terminal 13c on the positive side of the first rectification circuit 13. After flowing through the smoothing capacitor 14 and load 15, the current flows to the other end of the commercial AC power supply 11 through a path constituted by the output terminal 16d on the negative side of the second rectification circuit 16, diode D4 of the second rectification circuit 16 and the other input terminal 16b of the second rectification circuit 16.

While the alternating-current voltage of the commercial AC power supply 11 remains at the negative level, a current flows through the smoothing capacitor 14 and load 15, through a path constituted by the other end of the commercial AC power supply 11, the other input terminal 13b of the first rectification circuit 13, diode D2 of the first rectification circuit 13, and the positive-side output terminal 13c of the first rectification circuit 13. After flowing through the smoothing capacitor 14 and load 15, the current flows to one end of the commercial power supply 11 through a path constituted by the output terminal 16d on the negative side of the second rectification circuit 16, diode D3 of the second rectification circuit 16, one end of the input terminal 16a of the second rectification circuit 16, and the reactor 12.

To the positive-side output terminal 16c of the second rectification circuit 16, a switching element is connected. For example, the collector of a transistor 17 is connected to the positive-side output terminal 16c. The emitter of the transistor 17 is connected to the output terminal 13d on the negative side of the first rectification circuit 13. The transistor 17 may be a bipolar transistor, an IGBT, or a MOSFET. A control unit 20 designed to drive and control the is transistor 17, thereby to improve the power factor, is connected to the commercial AC power supply 11.

The reactor 12, the first rectification circuit 13, the smoothing capacitor 14, the second rectification circuit 16, and the control unit 20 constitute a direct-current power supply apparatus.

The control unit 20 turns on the transistor 17 only for a short time after the alternating-current voltage applied from the commercial AC power supply 11 has passed through the zero-crossing point. If the transistor 17 remains on, a short-circuit path for the commercial AC power supply 11 is formed. This short-circuit path comprises the reactor 12, one of the diodes of the second rectification circuit 16, the transistor 17, and one of the diodes of the first rectification circuit 13.

That is, if the alternating-current voltage of alternating current applied from the commercial AC power supply 11 falls from the positive level to the negative level and passes through the zero-crossing point, the transistor 17 is turned on only for a short time after the alternating-current voltage has passed through the zero-crossing point. While the transistor 17 remains on, a short-circuit current flows through the one-dot dashed line arrow, from one end of the commercial AC power supply 11 to the other end of the commercial AC power supply 11, through a path constituted by, the reactor 12, one input terminal 16a of the second rectification circuit 16, diode D1 of the second rectification circuit 16, the output terminal 16c on the positive side of the second rectification circuit 16, the collector-emitter path of the transistor 17, the output terminal 13d on the negative side of the first rectification circuit 13, diode D4 of the first rectification circuit 13, and the other input terminal 13b of the first rectification circuit 13.

If the alternating-current voltage applied from the commercial AC power supply 11 rises from the negative level to the positive level and passes through the zero-crossing point, the transistor 17 is turned on, too, only for a short time after the voltage has passed through the zero-crossing point. In the case, while the transistor 17 remains on, a short-circuit current flows from the other end of the commercial power supply 11 to the commercial AC power supply 11 through a path constituted by the other input terminal 16b of a second rectification circuit 16, diode D2 of the second rectification circuit 16, the output terminal 16c on the positive side of the second rectification circuit 16, the collector-emitter path of the transistor 17, the output terminal 13d on the negative side of the first rectification circuit 13, diode D3 of the first rectification circuit 13, the one input terminal 13a of the first rectification circuit 13, the reactor 12, and one end of the commercial AC power supply 11.

The short-circuit path is thus temporarily formed, for only a short time after the alternating-current voltage applied from the commercial AC power supply 11 has passed through the zero-crossing point. This improves the power factor of the power supply. The improvement of the power factor, which results from the formation of short-circuit, will not be described here, because it is a generally known art as evident from the above-identified publication.

As indicated above, while the alternating-current voltage of the commercial AC power supply 11 remains at the positive level, a current flows through only diode D1, i.e., one of the four diodes of the first rectification circuit 13, and through only diode D4, i.e., one of the four diodes of the second rectification circuit 16. While the alternating-current voltage of the commercial AC power supply 11 remains at the negative level, a current flows through only diode D2, i.e., one of the four diodes of the first rectification circuit 13, and through only diode D3, i.e., one of the four diodes of the second rectification circuit 16. If a short-circuit path is formed to improve the power-supply power factor, a current flows through one of the four diodes of the second rectification circuit 16, and through one of the four diodes of the first rectification circuit 13.

Since current flows through only one of the four diodes of the first rectification circuit 13 and through only one of the four diodes of the second rectification circuit 16, the heat the rectification circuits 13 and 16 generates can be reduced. Therefore, a large heat radiating means need not be provided for the rectification circuits 13 and 16.

Since a large heat radiating means need not be provided for the rectification circuits 13 and 16, the direct-current power supply apparatus can be prevented from becoming larger and its cost prevented from rising.

[2] Second Embodiment

A second embodiment of the present invention will be described with reference to FIG. 2. The components identical to those shown in FIG. 1 are designated by the same reference numbers and will not be described in detail.

Figure 2:
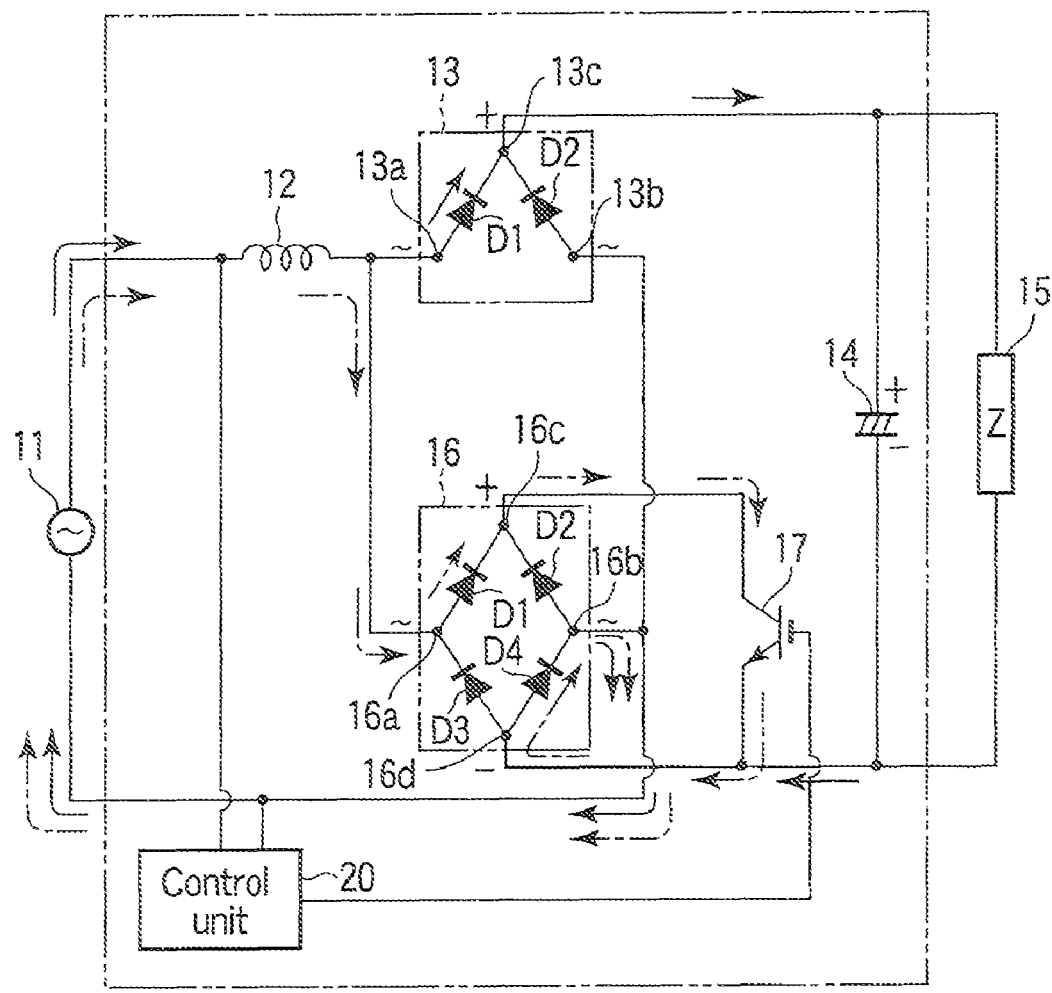
FIG. 2 is a block diagram showing the configuration of a second embodiment of the present invention.

As shown in FIG. 2, the first rectification circuit 13 has no elements equivalent to diodes D3 and D4. In other words, the first rectification circuit 13 is composed of only two diodes D1 and D2. A current flows through diode D1 from the input terminal 13a to the output terminal 13c on the positive side, while the input alternating-current voltage remains at the positive level. A current flows through diode D2 from the other input terminal 13b to the output terminal 13c on the positive side, while the input alternating-current voltage remains at the negative level.

As a result, the output terminal 16c on the positive side of the second rectification circuit 16 is connected to the collector of the transistor 17. The emitter of the transistor 17 is therefore connected to the output terminal on the negative side of the second rectification circuit 16.

When the control unit 20 turns on the transistor 17, a short-circuit path is formed for the commercial AC power supply 11. This short-circuit path is constituted by the reactor 12, one of the diodes of the second rectification circuit 16, the transistor 17, and another diode of the second rectification circuit 16.

Therefore, if the alternating-current voltage of the commercial AC power supply 11 rises from the negative level to the positive level and passes through the zero-crossing point, the transistor 17 is turned on for only a short time after the voltage has passed through the zero-crossing point. As the transistor 17 is so turned on, the a short-circuit current flows as indicated by the one-dot dashed line, from one end of the commercial AC power supply 11 to the other end of the commercial AC power supply 11, through a path constituted by the reactor 12, one input terminal 16a of the second rectification circuit 16, diode D1 of the second rectification circuit 16, the output terminal 16c on the positive side of the second rectification circuit 16, the emitter-collector path of the transistor 17, the output terminal 16d on the negative side of the second rectification circuit 16, diode D4 of the second rectification circuit 16, and the other input terminal 16b of the second rectification circuit 16.

As the alternating-current voltage of the commercial AC power supply 11 falls from the positive level to the negative level and passes through the zero-crossing point, the transistor 17 is turned on for only a short time after the voltage has passed through the zero-crossing point. While the transistor 17 remains on, a short-circuit current flows from the other end of the commercial AC power supply 11 to one end of the commercial AC power supply 11, through a path constituted by the other input terminal 16b of the second rectification circuit 16, diode D2 of the second rectification circuit 16, the output terminal 16c on the positive side of the second rectification circuit 16, the output terminal 16d on the negative side of the second rectification circuit 16, diode D3 of the second rectification circuit 16, one input terminal 16a of the second rectification circuit 16, and the reactor 12.

Thus, only for a short time after the alternating-current voltage of the commercial AC power supply 11 has passed through the zero-crossing point, a short-circuit path is temporarily formed for the commercial AC power supply 11.

As describe above, while the alternating current of the commercial AC power supply 11 remains at the positive level, a current flows through only diode D1, i.e., one of the two diodes of the first rectification circuit 13, and through only diode D4, i.e., one of the four diodes of the second rectification circuit 16. While the alternating current of the commercial AC power supply 11 remains at the negative level, a current flows through only diode D2, i.e., one of the two diodes of the first rectification circuit 13, and through only diode D3, i.e., one of the four diodes of the second rectification circuit 16.

Since a current flows through only one diode of the first rectification circuit 13 and a current flows through only one diode of the second rectification circuit 16, the heat each of the rectification circuits 13 and 16 generates can be reduced.

If a short-circuit path is formed to increase the power factor of the power supply, currents indeed flow through the two of the four diodes of the second rectification circuit 16 at the same time. Nonetheless, this short-circuit path formed to increase the power factor of the power supply exists for a short time after the alternating-current voltage has passed the zero-crossing point. The amount of heat generated while currents flow through both diodes is therefore small.

Hence, a large heat radiating means need not be provided on the rectification circuit 13 or the rectification circuit 16. This can prevent the direct-current power supply apparatus from becoming larger and its cost from rising.

[3] Third Embodiment

A third embodiment of the present invention will be described.

The third embodiment is a modification of the second embodiment.

As shown in FIG. 3, the first rectification circuit 13 comprises four diodes D1, D2, D3 and D4 as in the first embodiment. In all other structural respects and in operation, the third embodiment is identical to the second embodiment. Therefore, the third embodiment will not be described in further detail.

[4] Fourth Embodiment

A fourth embodiment of the present invention will be described with reference to FIG. 4. The components identical to those shown in FIG. 1 are designated by the same reference numbers and will not be described in detail.

Figure 4:
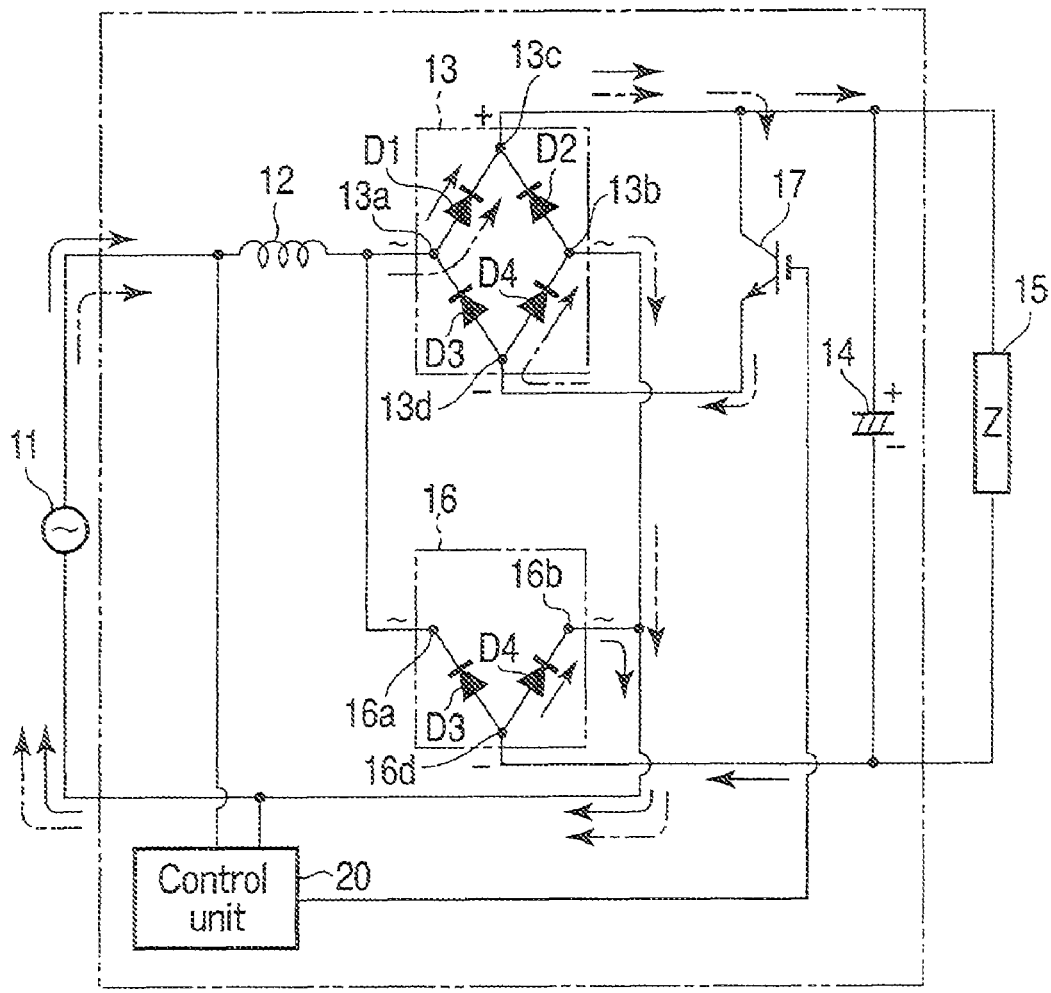
FIG. 4 is a block diagram showing the configuration of a four embodiment of the present invention.
Figure 5:
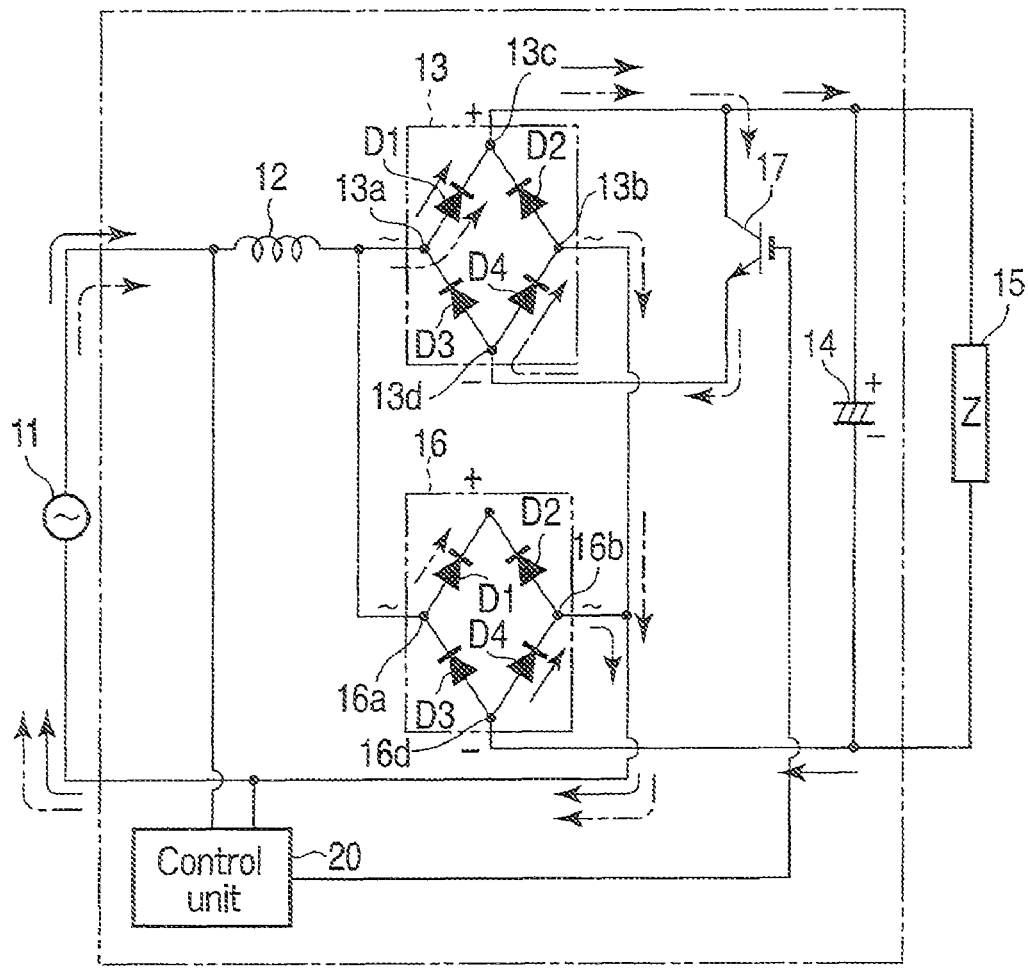
FIG. 5 is a block diagram showing the configuration of a five embodiment of the present invention.

As shown in FIG. 4, the second rectification circuit 16 does not have two diodes D1 and D2. That is, the second rectification circuit 16 comprises two diodes D3 and D4 only. While the alternating-current voltage applied to it remains at the negative level, diode D3 makes a current flow from the negative input terminal 16d to one input terminal 16a. While the alternating-current voltage applied to it remains at the positive level, diode D4 makes a current flow from the negative input terminal 16d to the other input terminal 16b.

The collector of the transistor 17 is connected to the output terminal 13c on the positive side of the first rectification circuit 13. The emitter of the transistor 17 is connected to the output terminal 13d on the negative side of the first rectification circuit 13.

When the control unit 20 turns on this transistor 17, the reactor 12 and one of the diodes of the first rectification circuit 13, the transistor 17 and another diode of the first rectification circuit 13 constitute a short-circuit path to the commercial power supply 11.

That is, the AC voltage of the commercial power supply 11 rises from the negative level to the positive level and passes the zero-crossing point, and the transistor 17 is on for a short time after the alternating-current voltage has passed the zero-crossing point. While the transistor 17 remains on, a short-circuit current flows from one end of the commercial power supply 11 to the other end of the commercial power supply 11, as indicated by the one-dot, dashed line arrow in FIG. 4, through a path constituted by the reactor 12, the input terminal 13a of the first rectification circuit 13, diode D1 of the first rectification circuit 13, the output terminal 13c on the positive side of the first rectification circuit 13, the emitter-collector path of the transistor 17, the output terminal 13d on the negative side of the first rectification circuit 13, diode D4 of the first rectification circuit 13 and the other input terminal 13b of the first rectification circuit 13.

As the alternating-current voltage of the commercial AC power supply 11 falls from the positive level to the negative level and passes the zero-crossing point, the transistor 17 is on for a short time after the alternating-current voltage has passed the zero-crossing point. In this case, too, a short-circuit current flows from the end of the commercial power supply 11 to the first-mentioned end of the commercial power supply 11, through a path constituted by the other input terminal 13b of the first rectification circuit 13, diode D2 of the first rectification circuit 13, the output terminal 13c on the positive side of the first rectification circuit 13, the emitter-collector path of the transistor 17, the output terminal 13*d* on the negative side of the first rectification circuit 13, diode D3 of the first rectification circuit 13, the input terminal 13*a* of the first rectification circuit 13 and the reactor 12.

Thus, a short-circuit path is temporarily formed for the commercial AC power supply 11, only for a short time after the alternating-current voltage has passed the zero-crossing point. This increases the power factor of the power supply.

As described above, while the alternating-current voltage of the commercial AC power supply 11 remains at the positive level, a current flows through diode D1, i.e., one of the four diodes of the first rectification circuit 13, and a current flows through diode D4, i.e., one of the two diodes of the second rectification circuit 16. While the alternating-current voltage of the commercial AC power supply 11 remains at the negative level, a current flows through diode D2, i.e., one of the four diodes of the first rectification circuit 13, and a current flows through diode D3, i.e., the other of the two diodes of the second rectification circuit 16.

Since current flows through only one diode of the first rectification circuit 13 and current flows through only one diode of the second rectification circuit 16, the heat each rectification circuit generates can be reduced.

If a short-circuit path is formed to increase the power factor of the power supply, currents indeed flow through the two of the four diodes of the second rectification circuit 16 at the same time. Nonetheless, this short-circuit path formed to increase the power factor of the power supply exists for a short time after the alternating-current voltage has passed the zero-crossing point. The amount of heat generated while currents flow through both diodes is therefore small.

Hence, a large heat radiating means need not be provided on the rectification circuit 13 or the rectification circuit 16. This can prevent the direct-current power supply apparatus from becoming larger and its cost from rising.

[5] Fifth Embodiment

A fifth embodiment of the present invention will be described.

The fifth embodiment is a modification of the fourth embodiment.

Figure 6:
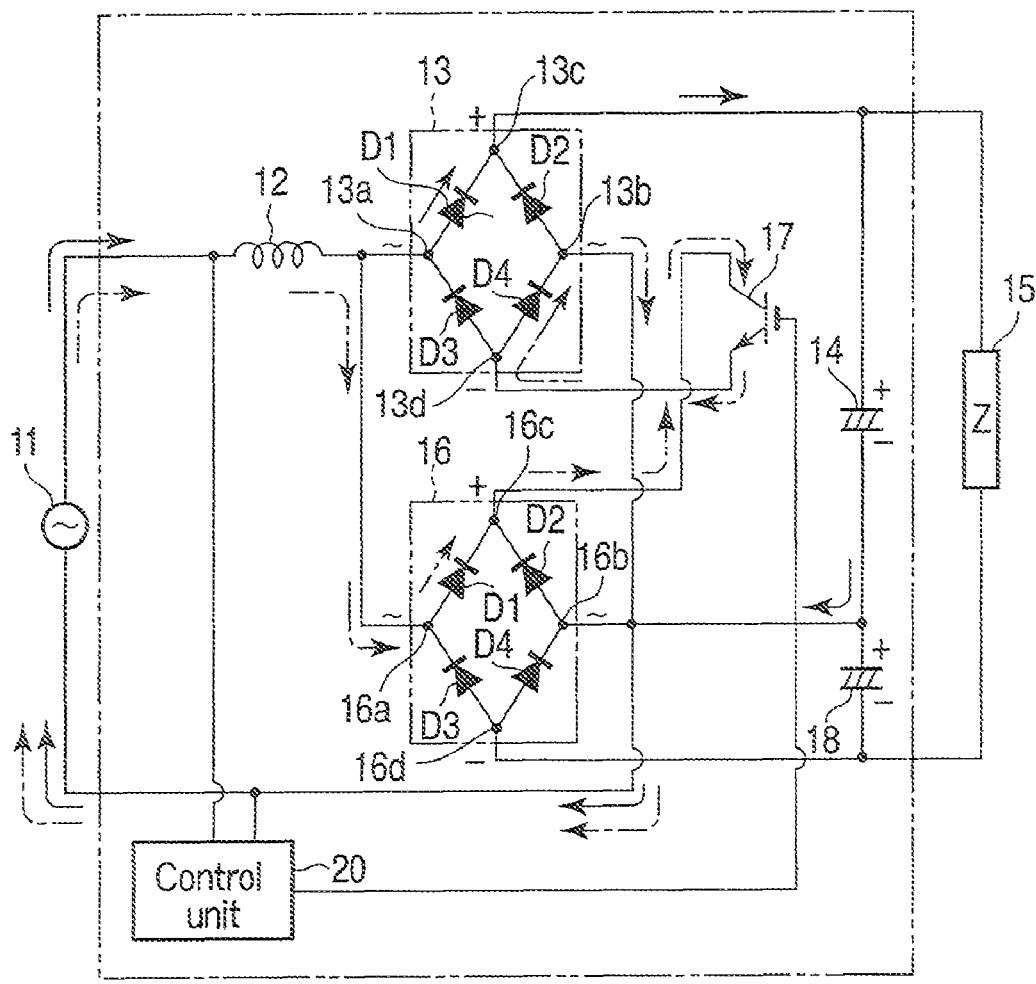
FIG. 6 is a block diagram showing the configuration of a six embodiment of the present invention.

As shown in FIG. 6, The second rectification circuit 16 comprises four diodes D1, D2, D3 and D4 as in the first embodiment. In all other structural respects and in operation, the fifth embodiment is identical to the fourth embodiment. Therefore, the fifth embodiment will not be described in further detail.

[6] Sixth Embodiment

A sixth embodiment of the present invention will be described.

As shown in FIG. 6, a serial circuit composed of two smoothing capacitors 14 and 18 is connected between the output terminal 13*c* on the positive side of the first rectification circuit 13 and the output terminal 16*d* on the negative side of the second rectification circuit 16. The connecting point of the smoothing capacitors 14 and 18 is connected to one of the terminals of a commercial AC power supply 11.

The first rectification circuit 13, second rectification circuit 16 and smoothing diodes 14 and 18 constitute a double-voltage rectification circuit.

While the alternating-current voltage of the commercial AC power supply 11 remains at the positive level, a current flows from one end of the commercially AC available power supply 11 to the smoothing capacitor 14 as shown by the solid-line arrow in FIG. 6, through a path constituted by the reactor 12, one input terminal 13*a* of the first rectification circuit 13, diode D1 of the first rectification circuit 13 and the output terminal 13*c* on the positive side of the first rectification circuit 13. After flowing through the smoothing capacitor 14, the current flows to the other end of the commercial AC power supply 11 through the connected point of the smoothing capacitors 14 and 18. The smoothing capacitor 14 is thereby charged.

While the alternating-current voltage of the commercial AC power supply 11 remains at the negative level, a current flows from the other end of the commercial AC power supply 11 to the smoothing capacitor 18, through a connected point of the smoothing capacitors 14 and 18. After flowing through the smoothing capacitor 1B, the current flows to one end of the commercial AC power supply 11 through the output terminal 16*d* on the negative side of the second rectification circuit 16, diode D3 of the second rectification circuit 16, one input terminal 16*a* of the second rectification circuit 16 and the reactor 12. The smoothing capacitor 18 is thereby charged.

Thus, the smoothing capacitors 14 and 18 are alternately charged. A direct-current voltage nearly twice the voltage of the commercial AC power supply 11 is therefore applied to the load 15.

In all other structural respects and in operation, the sixth embodiment is identical to the first embodiment. Therefore, the sixth embodiment will not be described in further detail.

Any direct-current power supply apparatus according to the present invention can be used in various electrical apparatuses that require a direct-current voltage.

What is claimed is:

1. A direct-current power supply apparatus comprising:
a reactor;
a first rectification circuit including a pair of first input terminals connected to an alternating-current power supply by the reactor, a plurality of first diodes which rectify a voltage applied to the first input terminals, and first positive side and first negative side output terminals which output a voltage rectified by the first diodes, the first positive side output terminal being connected to one end of a load;
a second rectification circuit including a pair of second input terminals connected to the alternating-current power supply by the reactor, a plurality of second diodes which rectify a voltage applied to the second input terminals, and second positive side and second negative side output terminals which output a voltage rectified by the second diodes, the second negative side output terminal being connected to the other end of the load;
a switch element connected between the second positive side output terminal of the second rectification circuit and the first negative side output terminal of the first rectification circuit, and which constitutes a short-circuit path for the alternating-current power supply, together with the reactor, one of the second diodes of the second rectification circuit and one of the first diodes of the first rectification circuit; and
a control unit which turns on the switch element for a short time after the voltage of the alternating-current power supply has passed zero-crossing point, thereby forming the short-circuit path;
wherein
the first rectification circuit conducts current from the alternating-current power supply to one end of the load via one of the first input terminals, one of the first diodes, and the first positive side output terminal; and the second rectification circuit conducts current from the other end of the load to the alternating-current power supply via the second negative side output terminal, one of the second diodes, and one of the second input terminals.

2. The direct-current power supply apparatus according to claim 1, further comprising a smoothing capacitor connected between the first positive side output terminal of the first rectification circuit and the second negative output terminal of the second rectification circuit.

3. The direct-current power supply apparatus according to claim 1, wherein
the plurality of first diodes of the first rectification circuit are four diodes which are bridge-connected; and
the plurality of second diodes of the second rectification circuit are four diodes which are bridge-connected.

4. The direct-current power supply apparatus according to claim 1, further comprising a serial circuit composed of two smoothing capacitors, connected between the first positive side output terminal of the first rectification circuit and the second negative side output terminal of the second rectification circuit, having a connected point connected to one terminal of the alternating-current power supply, and forming a double-voltage rectification circuit, together with the first and second rectification circuits.

5. The direct-current power supply apparatus according to claim 1, wherein the plurality of first diodes of the first rectification circuit are four diodes which are bridge-connected to achieve full-wave rectification, wherein one of the diodes conducts current from the alternating-current power supply to the one end of the load via one of the first input terminals and the first positive side output terminal while the voltage of the alternating-current power supply remains at the positive level, and another one of the diodes conducts current from the other one end of the load to the alternating-current power supply via the other one of the first input terminals and the first positive side output terminal while the voltage of the alternating-current power supply remains at the negative level, and the plurality of second diodes of the second rectification circuit are four diodes which are bridge-connected to achieve full-wave rectification, wherein one of the diodes conducts current from the other one end of the load to the alternating-current power supply via the second negative side output terminal and one of the second input terminals while the voltage of the alternating-current power supply remains at the positive level, and another one of the diodes makes the current flow from the other one end of the load to the alternating-current power supply via the second negative side output terminal and the other one of the second input terminals while the voltage of the alternating-current power supply remains at the negative level.

6. A direct-current power supply apparatus comprising:
a reactor;
a first rectification circuit including a pair of first input terminals connected to an alternating-current power supply by the reactor, a plurality of first diodes which rectify a voltage applied to the first input terminals and a first positive side output terminal connected to one end of a load;
a second rectification circuit including a pair of second input terminals connected to the alternating-current power supply by the reactor, four first diodes which are bridge-connected to achieve full-wave rectification and which rectify a voltage applied to the second input terminals, a second positive side output terminal and a second negative side output terminal which output a voltage rectified by the second diodes, and the second negative side terminal connected to the other end of the load;

a switch element connected between the second positive side output terminal and the second negative side output terminal, and which constitutes a short-circuit path for the alternating-current power supply together with the reactor and the second rectification circuit, a control unit which turns on the switch element for a short time after the voltage of the alternating-current power supply has passed zero-crossing point, thereby forming the short- circuit path, wherein the first rectification circuit conducts current from the alternating-current power supply to one end of the load via the first positive side output terminal, and the second rectification circuit conducts current from the other end of the load to the alternating-current power supply via the second negative side output terminal.

7. The direct-current power supply apparatus according to claim 6, wherein the plurality of first diodes of the first rectification circuit are two diodes, one of the diodes conducting current from the alternating-current power supply to the one end of the load via one of the second input terminals and the first positive side output terminal while the voltage of the alternating-current power supply remains at the positive level, and the other one of the diodes conducting current from the other one end of the load to the alternating-current power supply via one of the first input terminals and the first positive side output terminal while the voltage of the alternating-current power supply remains at the negative level.

8. The direct-current power supply apparatus according to claim 6, wherein the plurality of first diodes of the first rectification circuit are four diodes which are bridge-connected to achieve full-wave rectification, one of the diodes conducting current from the alternating-current power supply to the one end of the load via one of the first input terminals and the first positive side output terminal while the voltage of the alternating-current power supply remains at the positive level, and the other one of the diodes conducting current from the other one end of the load to the alternating-current power supply via the other one of the first input terminals and the first positive side output terminal while the voltage of the alternating-current power supply remains at the negative level.

9. A direct-current power supply apparatus comprising:
a reactor:
a first rectification circuit including a pair of first input terminals connected to an alternating-current power supply by the reactor, four first diodes which are bridge-connected to achieve full-wave rectification and which rectify a voltage applied to the first input terminals, a first positive side output terminal and a first negative side output terminal which output a voltage rectified by the first diodes, the first positive side output terminal being connected to one end of a load;
a second rectification circuit including a pair of second input terminals connected to the alternating-current power supply by the reactor, a plurality of second diodes which rectify a voltage applied to the second input terminals and a second negative side output terminal connected to the other end of the load;

a switch element connected between the first positive side output terminal and the first negative side output terminal and which constitutes a short-circuit path for the alternating-current power supply together with the reactor and the first rectification circuit a control unit which turns on the switch element for a short time after the voltage of the alternating-current power supply has passed zero-crossing point, thereby forming the short- circuit path;

wherein the first rectification circuit conducts current from the alternating-current power supply to one end of the load via the first positive side output terminal, and the second rectification circuit conducts current from the other end of the load to the alternating-current power supply via the second negative side output terminal.

10. The direct-current power supply apparatus according to claim 9 wherein the plurality of second diodes of the second rectification circuit are two diodes one of the diodes conducting current from the other one end of the load to the alternating-current power supply via the second negative side output terminal and one of the second input terminals while the voltage of the alternating-current power supply remains at the positive level, and the other one of the diodes conducting current from the other one end of the load to the alternating-current power supply via the second negative side output terminal and the other one of the second input terminals while the voltage of the alternating-current power supply remains at the negative level.

11. The direct-current power supply apparatus according to claim 9 wherein the plurality of second diodes of the second rectification circuit are four diodes which are bridge-connected to achieve full-wave rectification, one of the diodes conducting current from the other one end of the load to the alternating-current power supply via the second negative side output terminal and one of the second input terminals while the voltage of the alternating-current power supply remains at the positive level, and another one of the diodes conducting current from the other one end of the load to the alternating-current power supply via the second negative side output terminal and the other one of the second input terminals while the voltage of the alternating-current power supply remains at the negative level.

* * * * *